(12) United States Patent
Lin (10) Patent No.: US 12,006,600 B2
(45) Date of Patent: Jun. 11, 2024

(54) YARN AND FABRIC WITH NANO-POWDER MIXTURE

(71) Applicant: STAR LACE CO., LTD., Taipei (TW)

(72) Inventor: Sheng-Yi Lin, Taipei (TW)

(73) Assignee: STAR LACE CO., LTD., Taipei (TW)

( * ) Notice: Subject to any disclaimer, the term of this patent is extended or adjusted under 35 U.S.C. 154(b) by 293 days.

(21) Appl. No.: 17/529,502

(22) Filed: Nov. 18, 2021

(65) Prior Publication Data

US 2023/0109186 A1 Apr. 6, 2023

(30) Foreign Application Priority Data

Oct. 5, 2021 (TW) ................... 110137079

(51) Int. Cl.
| | |
|---|---|
| *D03D 15/283* | (2021.01) |
| *B82Y 30/00* | (2011.01) |
| *B82Y 40/00* | (2011.01) |
| *D03D 15/25* | (2021.01) |

(52) U.S. Cl.
CPC ........... *D03D 15/283* (2021.01); *D03D 15/25* (2021.01); *B82Y 30/00* (2013.01); *B82Y 40/00* (2013.01); *D10B 2501/02* (2013.01); *D10B 2501/04* (2013.01)

(58) Field of Classification Search
CPC ....... B82Y 30/00; B82Y 40/00; D03D 15/292
See application file for complete search history.

(56) References Cited

U.S. PATENT DOCUMENTS

| | | | | |
|---|---|---|---|---|
| 2006/0024228 A1* | 2/2006 | Liang | ................ | C01G 23/0536 |
| | | | | 423/610 |
| 2015/0299904 A1* | 10/2015 | Weiser | ...................... | D01F 1/10 |
| | | | | 428/36.1 |
| 2019/0062957 A1* | 2/2019 | Su | ........................... | D02G 3/04 |

FOREIGN PATENT DOCUMENTS

| | | | | |
|---|---|---|---|---|
| CN | 103290510 A | * | 9/2013 | |
| CN | 107779984 B | * | 2/2020 | ............... D01F 1/10 |
| TW | 201720756 A | | 6/2017 | |

* cited by examiner

*Primary Examiner* — Elizabeth M Imani
(74) *Attorney, Agent, or Firm* — MUNCY, GEISSLER, OLDS & LOWE, P.C.

(57) ABSTRACT

A yarn made from a mixture of a grain and a first polymer by spinning is provides. The yarn includes a plurality of fibers. Each fiber has a surface layer and a core layer surrounded by the surface layer. The surface layer is made from the grain and the first polymer. The core layer is made from the first polymer. The grain includes a nano-powder mixture and a second polymer. A weight percentage of the nano-powder mixture in the grain is from 60% to 70%. The nano-powder mixture includes silicon dioxide, magnesium oxide and aluminum oxide. A weight ratio of silicon dioxide to magnesium oxide in the nano-powder mixture is from 2:1 to 1:2. A weight ratio of silicon dioxide to aluminum oxide in the nano-powder mixture is from 2:1 to 1:2.

22 Claims, 5 Drawing Sheets

YARN AND FABRIC WITH NANO-POWDER MIXTURE

CROSS REFERENCE TO RELATED APPLICATIONS

This Non-provisional application claims priority under 35 U.S.C. § 119(a) on Patent Application No(s). 110137079 filed in Taiwan, Republic of China on Oct. 5, 2021, the entire contents of which are hereby incorporated by reference.

BACKGROUND OF THE INVENTION

Field of Invention

The disclosure relates to a yarn and a fabric which include the nano-powder mixture. The disclosure especially relates the yarn and the fabric made from the nano-powder mixture which emitting far infrared rays.

Related Art

Far infrared rays are electromagnetic waves with a wavelength between 5.6 and 1000 micrometers (μm). The application principle of the far infrared ray is to act on the human body or an object by the resonance effect, and thus the far infrared ray can transfer heat directly. Recent studies have indicated that the wavelength ranged between 4-14 micrometers (μm) is most effectively absorbed by organisms, and this range is within the wavelength range of far infrared ray. Therefore, far infrared ray can be widely used in human bodies. The energy of far infrared rays is mild which can penetrate the skin and enter the subcutaneous capillaries without harming human cells. Therefore, it is often used to promote the absorption of heat energy by human cells, promote the expansion of capillaries, and increase the blood circulation rate of the body. In addition, far infrared rays can also improve immune function and promote metabolism, thereby reducing inflammation and helping the detoxification of the body.

Since far infrared ray has a variety of functions, many far infrared fabrics are already used in commerce. There are two main production methods of the said far infrared fabrics. One method is to grind the raw materials (such as tourmaline), which can emit far infrared rays, into microparticles, and use a special method to make them directly attach to the fibers of the fabric. The other one is to suspend the microparticles in a solution, then immerse the fabric into the solution, so that the microparticles can be attached to the fabric. Both of these methods are immersing the fabric in a solution, so as to let the fabric absorb the particles to attach them on the fabric. However, the microparticles is not firmly fixed on the fabric, and the microparticles may detach from the fabric easily due to long-term use and repeated washing. Thus, the ability of the fabric to emit far infrared rays is gradually reduced. Moreover, the raw material such as tourmaline has a limited ability to emit far infrared rays.

Accordingly, it is desired to provide a yarn and a fabric made from a raw material which has good ability to emit far infrared rays. The yarn and the fabric can avoid the problem that the ability to emit far infrared rays is gradually reduced according to use time.

SUMMARY OF THE INVENTION

In view of the foregoing, the disclosure provides a yarn and a fabric which made from a grain. The grain is made from a raw material which has good ability to emit far infrared rays. Moreover, the raw material of the yarn which is made from the grain would not detach from the yarn. Therefore, the far infrared rays emitting ability of the fabric which is made of the yarn is not gradually reduced according to use time.

To achieve the above objective, the disclosure provides a yarn which is made from a mixture of a grain and a first polymer by spinning. The yarn includes a plurality of fibers. Each fiber has a surface layer and a core layer. The core layer is surrounded by the surface layer. The surface layer is made from the grain and the first polymer. The core layer is made from the first polymer. Wherein, the grain includes a nano-powder mixture and a second polymer. A weight percentage of the nano-powder mixture in the grain is from 60% to 70%. The nano-powder mixture includes silicon dioxide, magnesium oxide and aluminum oxide. A weight ratio of the silicon dioxide to the magnesium oxide in the nano-powder mixture is from 2:1 to 1:2. A weight ratio of the silicon dioxide to the aluminum oxide in the nano-powder mixture is from 2:1 to 1:2.

In one embodiment, the nano-powder mixture further includes calcium oxide. A weight ratio of the silicon dioxide to the calcium oxide in the nano-powder mixture is from 2:1 to 1:2.

In one embodiment, the nano-powder mixture further includes zinc oxide. A weight ratio of the silicon dioxide to the zinc oxide in the nano-powder mixture is from 2:1 to 1:2.

In one embodiment, the nano-powder mixture further includes potassium oxide. A weight ratio of the silicon dioxide to the potassium oxide in the nano-powder mixture is from 2:1 to 1:2.

In one embodiment, the nano-powder mixture further includes calcium oxide, zinc oxide and potassium oxide. The silicon dioxide, the magnesium oxide, the aluminum oxide, the calcium oxide, the zinc oxide and the potassium oxide are in a weight ratio of 1:1:1:1:1:1.

In one embodiment, a particle size of the nano-powder mixture is from 450 nm to 500 nm.

In one embodiment, the polymer of the yarn (i.e. the first polymer) or the polymer of the grain (i.e. the second polymer) includes polyethylene, polypropylene, polyester, polyacrylonitrile, polyamide, or any combination thereof.

In one embodiment, a weight percentage of the core layer in each fiber is from 70% to 80%. A weight percentage of the surface layer in each fiber is from 20% to 30%.

In one embodiment, a weight percentage of the nano-powder mixture in the surface layer of each fiber is from 5% to 10%.

To achieve the above objective, the disclosure also provides a fabric which is manufactured by textile processing from warp yarns and weft yarns. Wherein, at least one of the warp yarns and the weft yarns includes the said yarn.

In one embodiment, the warp yarns and the weft yarns are the said yarns.

In one embodiment, the warp yarn is a yarn made from polyethylene, polypropylene, polyester, polyacrylonitrile, polyamide, or any combination thereof, and the weft yarn is the said yarn.

In one embodiment, the weft yarn is a yarn made from polyethylene, polypropylene, polyester, polyacrylonitrile, polyamide, or any combination thereof, and the warp yarn is the said yarn.

To achieve the above objective, the disclosure further provides a fabric which is manufactured by knitting the said yarn.

As mentioned above, the yarn and the fabric are made from the grain. The grain is made from the nano-powder mixture which has good ability to emit far infrared rays. Moreover, the nano-powder mixture of the yarn which is made from the grain would not detach from the yarn. Therefore, the far infrared rays emitting ability of the fabric which is made of the yarn is not gradually reduced according to use time.

DETAILED DESCRIPTION OF THE INVENTION

The embodiments and examples in this disclosure will be apparent from the following detailed description, which proceeds with reference to the accompanying figures, wherein the same references relate to the same elements.

Ranges: throughout this disclosure, various aspects of the disclosure can be presented in a range format. It should be understood that the description in range format is merely for convenience and brevity and should not be construed as an inflexible limitation on the scope of the disclosure. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual and partial numbers within that range, for example, 1, 2, 2.7, 3, 4, 5, 5.3 and 6. This applies regardless of the breadth of the range.

In this embodiment, the nano-powder mixture includes silicon dioxide, magnesium oxide and aluminum oxide. Wherein, a weight ratio of the silicon dioxide to the magnesium oxide in the nano-powder mixture is from 2:1 to 1:2, and a weight ratio of the silicon dioxide to the aluminum oxide in the nano-powder mixture is from 2:1 to 1:2. Preferably, the weight ratio of the silicon dioxide to the magnesium oxide in the nano-powder mixture can be 2:1, 1.9:1, 1.8:1, 1.7:1, 1.6:1, 1.5:1, 1.4:1, 1.3:1, 1.2:1, 1.1:1, 1:1, 1:1.1, 1:1.2, 1:1.3, 1:1.4, 1:1.5, 1:1.6, 1:1.7, 1:1.8, 1:1.9, 1:2, or any value and range encompassed between any two ratios within the foregoing ranges. Preferably, the weight ratio of the silicon dioxide to the aluminum oxide in the nano-powder mixture can be 2:1, 1.9:1, 1.8:1, 1.7:1, 1.6:1, 1.5:1, 1.4:1, 1.3:1, 1.2:1, 1.1:1, 1:1, 1:1.1, 1:1.2, 1:1.3, 1:1.4, 1:1.5, 1:1.6, 1:1.7, 1:1.8, 1:1.9, 1:2, or any value and range encompassed between any two ratios within the foregoing ranges.

In this embodiment, the nano-powder mixture further includes calcium oxide. Wherein, a weight ratio of the silicon dioxide to the calcium oxide in the nano-powder mixture is from 2:1 to 1:2. Preferably, the weight ratio of the silicon dioxide to the calcium oxide in the nano-powder mixture can be 2:1, 1.9:1, 1.8:1, 1.7:1, 1.6:1, 1.5:1, 1.4:1, 1.3:1, 1.2:1, 1.1:1, 1:1, 1:1.1, 1:1.2, 1:1.3, 1:1.4, 1:1.5, 1:1.6, 1:1.7, 1:1.8, 1:1.9, 1:2, or any value and range encompassed between any two ratios within the foregoing ranges.

In this embodiment, the nano-powder mixture further includes zinc oxide. Wherein, a weight ratio of the silicon dioxide to the zinc oxide in the nano-powder mixture is from 2:1 to 1:2. Preferably, the weight ratio of the silicon dioxide to the zinc oxide in the nano-powder mixture can be 2:1, 1.9:1, 1.8:1, 1.7:1, 1.6:1, 1.5:1, 1.4:1, 1.3:1, 1.2:1, 1.1:1, 1:1, 1:1.1, 1:1.2, 1:1.3, 1:1.4, 1:1.5, 1:1.6, 1:1.7, 1:1.8, 1:1.9, 1:2, or any value and range encompassed between any two ratios within the foregoing ranges.

In this embodiment, the nano-powder mixture further includes potassium oxide. Wherein, a weight ratio of the silicon dioxide to the potassium oxide in the nano-powder mixture is from 2:1 to 1:2. Preferably, the weight ratio of the silicon dioxide to the potassium oxide in the nano-powder mixture can be 2:1, 1.9:1, 1.8:1, 1.7:1, 1.6:1, 1.5:1, 1.4:1, 1.3:1, 1.2:1, 1.1:1, 1:1, 1:1.1, 1:1.2, 1:1.3, 1:1.4, 1:1.5, 1:1.6, 1:1.7, 1:1.8, 1:1.9, 1:2, or any value and range encompassed between any two ratios within the foregoing ranges.

In this embodiment, the nano-powder mixture further includes calcium oxide, zinc oxide and potassium oxide. Wherein, the silicon dioxide, the magnesium oxide, the aluminum oxide, the calcium oxide, the zinc oxide and the potassium oxide are in a weight ratio of is 1:1:1:1:1:1.

In this embodiment, a particle size of the nano-powder mixture is from 450 nm to 500 nm. Preferably, the particle size of the nano-powder mixture can be 450 nm, 455 nm, 460 nm, 465 nm, 470 nm, 475 nm, 480 nm, 485 nm, 490 nm, 495 nm, 500 nm, or any value and range encompassed between any two values within the foregoing ranges.

In this embodiment, the grain includes the said nano-powder mixture and a polymer (i.e. the second polymer). Wherein, a weight percentage of the nano-powder mixture in the grain is from 60% to 70%. Preferably, the weight percentage of the nano-powder mixture in the grain can be 60%, 61%, 62%, 63%, 64%, 65%, 66%, 67%, 68%, 69%, 70%, or any value and range encompassed between any two percentages within the foregoing ranges.

In this embodiment, the polymer of the grain (i.e. the second polymer) includes polyethylene, polypropylene, polyester, polyacrylonitrile, polyamide, or the combination thereof. Preferably, the polymer of the grain is polyethylene. Preferably, the polymer of the grain is polypropylene. Preferably, the polymer of the grain is polyester. Preferably, the polymer of the grain is polyacrylonitrile. Preferably, the polymer of the grain is polyamide. Preferably, the polymer of the grain is polyethylene and polypropylene. Preferably, the polymer of the grain is polyethylene and polyester. Preferably, the polymer of the grain is polyethylene and polyacrylonitrile. Preferably, the polymer of the grain is polyethylene and polyamide. Preferably, the polymer of the grain is polypropylene and polyester. Preferably, the polymer of the grain is polypropylene and polyacrylonitrile. Preferably, the polymer of the grain is polypropylene and polyamide. Preferably, the polymer of the grain is polyester and polyacrylonitrile. Preferably, the polymer of the grain is polyester and polyamide. Preferably, the polymer of the grain is polyacrylonitrile and polyamide. Preferably, the polymer of the grain is polyethylene, polypropylene and polyester. Preferably, the polymer of the grain is polyethylene, polypropylene and polyacrylonitrile. Preferably, the polymer of the grain is polyethylene, polypropylene and polyamide. Preferably, the polymer of the grain is polypropylene, polyester and polyacrylonitrile. Preferably, the polymer of the grain is polypropylene, polyester and polyamide. Preferably, the polymer of the grain is polyester, polyacrylonitrile and polyamide. Preferably, the polymer of the grain is polyethylene, polypropylene, polyester and polyacrylonitrile. Preferably, the polymer of the grain is polyethylene, polypropylene, polyester and polyamide. Preferably, the polymer of the grain is polypropylene, polyester, polyacrylonitrile and polyamide. Preferably, the polymer of the grain is polyethylene, polypropylene, polyester, polyacrylonitrile and polyamide. In this embodiment, the polyamide (PA) includes but not limited to PA6 (nylon 6), PA11 (nylon 11), PA12 (nylon 12), PA46 (nylon 46), PA66 (nylon 66), PA610 (nylon 610), PA612 (nylon 612).

In this embodiment, a particle size of the grain is from 0.1 cm to 0.5 cm. Preferably, the particle size of the grain can be 0.1 cm, 0.2 cm, 0.3 cm, 0.4 cm, 0.5 cm, or any value and range encompassed between any two values within the foregoing ranges.

In this embodiment, the grain can be produced by any machine for producing the grains as commonly known by one of ordinary skill in the art. For example, the weight percentage of the grain is 100%. The nano-powder mixture and the second polymer are mixed well, and then put into the machine for producing the grains. Wherein the weight percentage of the nano-powder mixture in the grain is 60% (or 61%, or 62%, or 63%, or 64%, or 65%, or 66%, or 67%, or 68%, or 69%, or 70%, or any value encompassed between any two percentages within the foregoing ranges) and the weight percentage of the second polymer is 40% (or 39%, or 38%, or 37%, or 36%, or 35%, or 34%, or 33%, or 32%, or 31%, or 30%, or any value encompassed between any two percentages within the foregoing ranges). The temperature of the jet of the machine is set to between 235° C. to 245° C. and the injection pressure of the jet is set to between 400 to 800 kg/cm$^2$. The grains are injected by the jet of the machine. Then, the dry temperature of the machine is set to 80° C., and after drying for 4 hours, the production of the grains is completed. In this embodiment, the second polymer can be PA6 (nylon 6). The particle size of the second polymer can be from 450 nm to 500 nm.

Figure 1A:
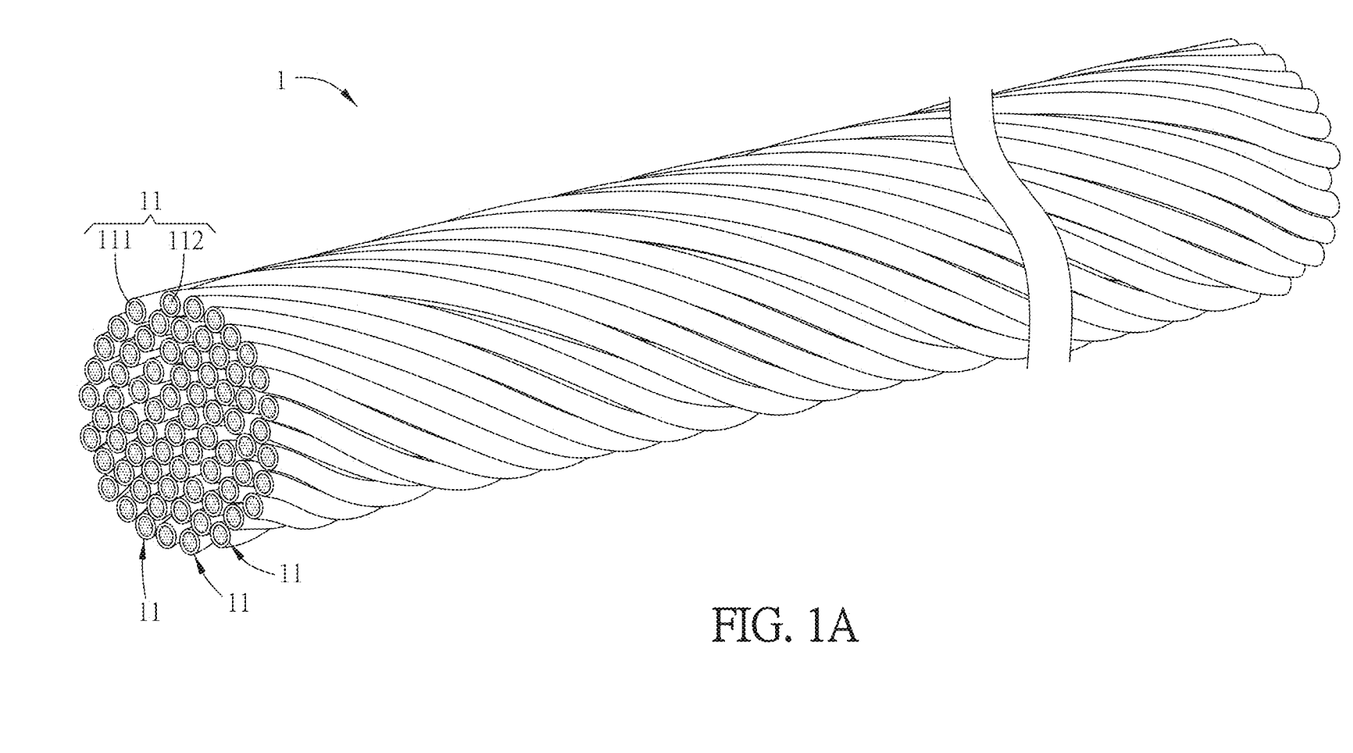
FIG. 1A is a schematic view of a yarn of this disclosure.
Figure 1B:
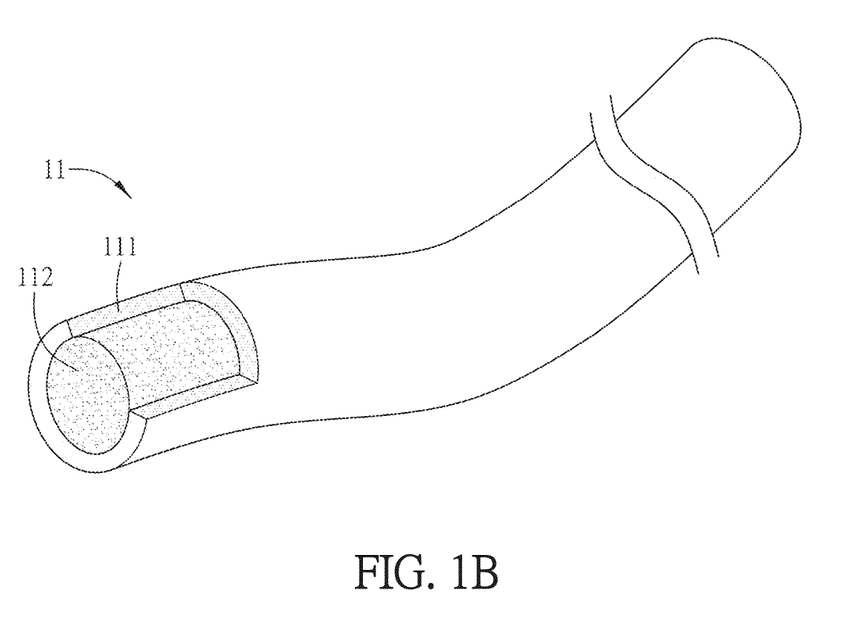
FIG. 1B is the schematic view of one of the fiber of the yarn in FIG. 1A.
Figure 2A:
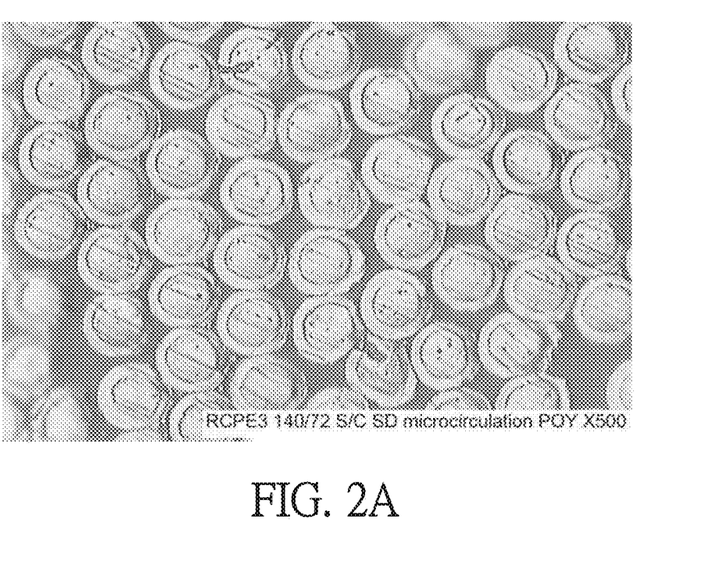
FIG. 2A shows the microscope photo of the yarn of this disclosure. This photo shows a partial structure of the yarn which is enlarged for 500×.
Figure 2B:
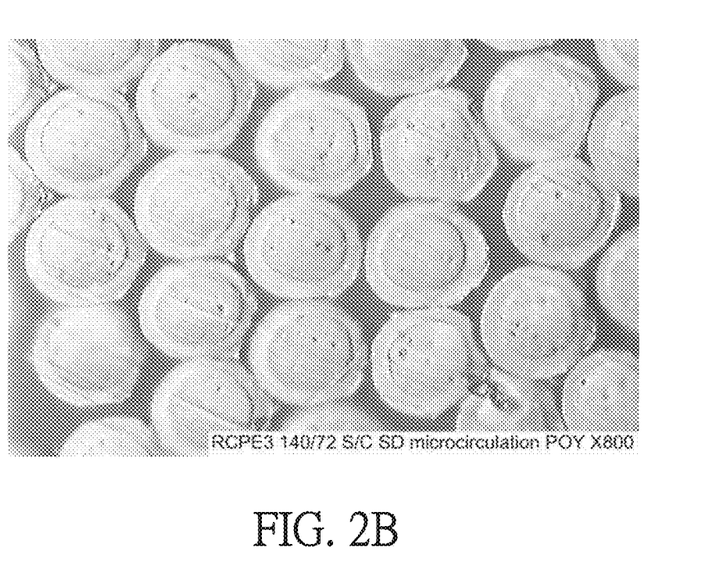
FIG. 2B shows the microscope photo of the yarn of this disclosure. This photo shows a partial structure of the yarn which is enlarged for 800×.

Please refer to FIGS. 1A, 1B, 2A and 2B. FIG. 1A is a schematic view of a yarn of this disclosure. FIG. 1B is the schematic view of one of the fiber of the yarn in FIG. 1A. FIG. 2A shows the microscope photo of the yarn of this disclosure. This photo shows a partial structure of the yarn which is enlarged for 500×. FIG. 2B shows the microscope photo of the yarn of this disclosure. This photo shows a partial structure of the yarn which is enlarged for 800×. In this embodiment, the disclosure provides a yarn 1 which is made from a mixture of the said grain and a polymer (i.e. the first polymer) by spinning. As shown in FIGS. 1A and 1B, the yarn 1 includes a plurality of fibers 11. Each fiber 11 has a surface layer 111 and a core layer 112. The core layer 112 is surrounded by the surface layer 111. The surface layer 111 is made from the grain and the first polymer. The core layer 112 is made from the first polymer. For example, the numbers of the fibers can be 70, 71, 72, 73, 74, 75, 76, 77, 78, 79, or 80, and all of the fibers assemble together to form a yarn 1. Preferably, the number of the fibers can be 72. It is to be noted that not all the fibers are shown in FIGS. 1A and 1B for observation easily. In addition, as shown in FIGS. 2A and 2B, these two microscope photos merely show the partial structure of the cut surface of the yarn. As shown in these microscope photos, each fiber has a surface layer and a core layer.

In this embodiment, the grain can be mixed with a first polymer and then the mixture is spun to form the said yarn. The polymer of the yarn (i.e. the first polymer) includes polyethylene, polypropylene, polyester, polyacrylonitrile, polyamide, or the combination thereof. Preferably, the polymer of the yarn is polyethylene. Preferably, the polymer of the yarn is polypropylene. Preferably, the polymer of the yarn is polyester. Preferably, the polymer of the yarn is polyacrylonitrile. Preferably, the polymer of the yarn is polyamide. Preferably, the polymer of the yarn is polyethylene and polypropylene. Preferably, the polymer of the yarn is polyethylene and polyester. Preferably, the polymer of the yarn is polyethylene and polyacrylonitrile. Preferably, the polymer of the yarn is polyethylene and polyamide. Preferably, the polymer of the yarn is polypropylene and polyester. Preferably, the polymer of the yarn is polypropylene and polyacrylonitrile. Preferably, the polymer of the yarn is polypropylene and polyamide. Preferably, the polymer of the yarn is polyester and polyacrylonitrile. Preferably, the polymer of the yarn is polyester and polyamide. Preferably, the polymer of the yarn is polyacrylonitrile and polyamide. Preferably, the polymer of the yarn is polyethylene, polypropylene and polyester. Preferably, the polymer of the yarn is polyethylene, polypropylene and polyacrylonitrile. Preferably, the polymer of the yarn is polyethylene, polypropylene and polyamide. Preferably, the polymer of the yarn is polypropylene, polyester and polyacrylonitrile. Preferably, the polymer of the yarn is polypropylene, polyester and polyamide. Preferably, the polymer of the yarn is polyester, polyacrylonitrile and polyamide. Preferably, the polymer of the yarn is polyethylene, polypropylene, polyester and polyacrylonitrile. Preferably, the polymer of the yarn is polyethylene, polypropylene, polyester and polyamide. Preferably, the polymer of the yarn is polypropylene, polyester, polyacrylonitrile and polyamide. Preferably, the polymer of the yarn is polyethylene, polypropylene, polyester, polyacrylonitrile and polyamide. It is to be noted that the polymer (i.e. the polymer of the yarn, which is also called the first polymer) which is used to spin and the polymer of grain (i.e. the second polymer) could be the same or different from each other.

In this embodiment, a weight percentage of the core layer 112 in each fiber 11 is from 70% to 80%, and a weight percentage of the surface layer 111 in each fiber 11 is from 20% to 30%. For example, the weight percentage of the core layer 112 in the fiber 11 can be 70%, 71%, 72%, 73%, 74%, 75%, 76%, 77%, 78%, 79%, 80%, or any value and range encompassed between any two percentages within the foregoing ranges. The weight percentage of the surface layer 111 in the fiber 11 can be 20%, 21%, 22%, 23%, 24%, 25%, 26%, 27%, 28%, 29%, 30%, or any value and range encompassed between any two percentages within the foregoing ranges. The summation of the weight percentage of the surface layer 111 and the weight ratio of the core layer 112 is 100%.

In this embodiment, a weight percentage of the nano-powder mixture in the surface layer 111 of each fiber 11 is from 5% to 10%. Preferably, the weight percentage of the nano-powder mixture in the surface layer 111 can be 5%, 6%, 7%, 8%, 9%, 10%, or any value and range encompassed between any two percentages within the foregoing ranges.

Figure 3:
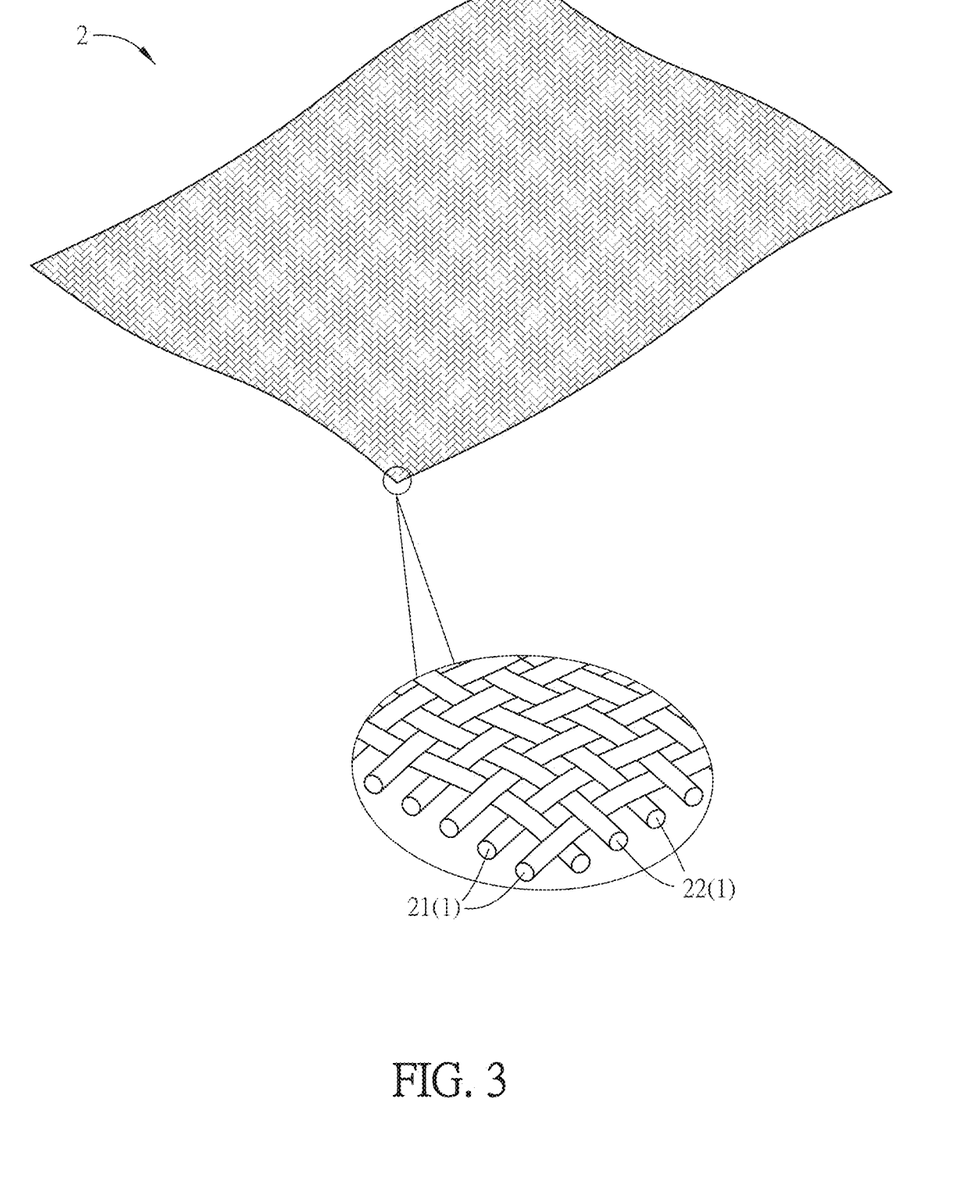
FIG. 3 is a schematic view of a fabric of this disclosure.

Please refer to FIG. 3, FIG. 3 is a schematic view of a fabric of this disclosure. In this embodiment, the disclosure provides a fabric 2 which is manufactured by textile processing from warp yarns 21 and weft yarns 22, wherein at least one of the warp yarns 21 and the weft yarns 22 includes the yarn 1. For example, the warp yarns 21 and the weft yarns 22 can be the said yarns 1. Alternatively, the warp yarn 21 can be a yarn which is made from polyethylene, polypropylene, polyester, polyacrylonitrile, polyamide, or any combination thereof, and the weft yarn 22 can be the said yarn 1. Alternatively, the weft yarn 22 can be a yarn which is made from polyethylene, polypropylene, polyester, polyacrylonitrile, polyamide, or any combination thereof, and the warp yarn 21 can be the said yarn 1.

Figure 4:
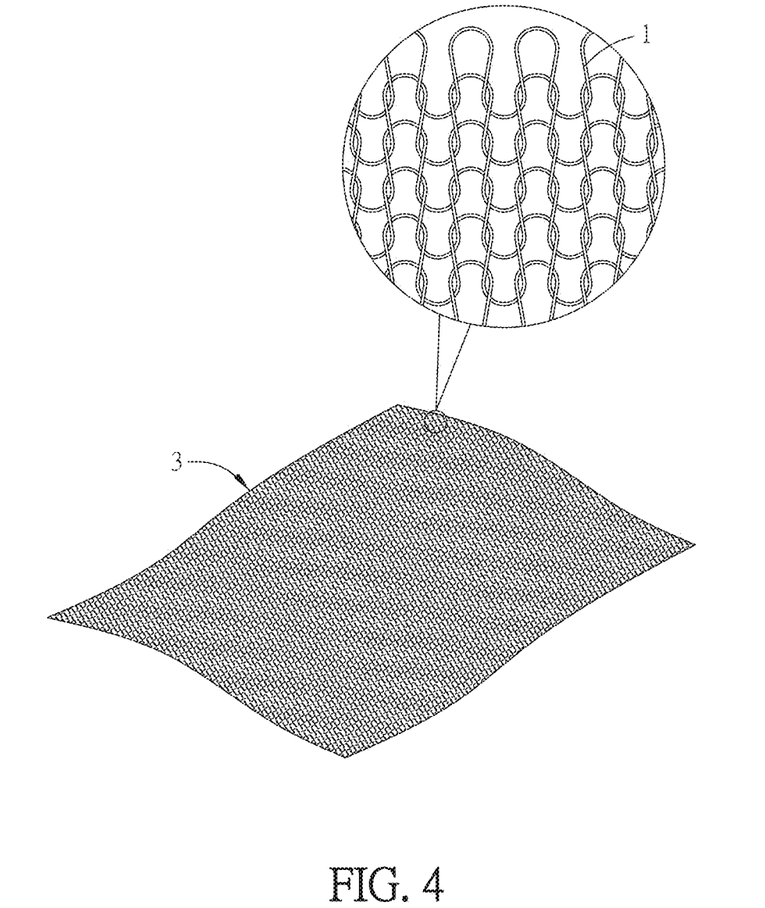
FIG. 4 is a schematic view of another fabric of this disclosure.

Please refer to FIG. 4, FIG. 4 is a schematic view of another fabric of this disclosure. In this embodiment, the disclosure provides a fabric 3 which is manufactured by knitting the said yarn 1. For example, the fabric 2, 3 can be made into common textiles, such like clothes, pants, skirts, shoes, socks, hats, hoods, leg covers, gloves, bras, coats, and so on. In addition, the fabric 2, 3 can be made by any machine as commonly known by one of ordinary skill in the art for knitting or weaving the fabrics with the said yarns 1.

The far infrared ray detection result of the fabric made from the said nano-powder mixture is shown below. This test is operated by Industrial Technology Research Institute (Taiwan) according to "standard measuring operating procedure of emissivity of far infrared ray". The instrument for measuring is VERTEX 70 FT-IR spectrophotometer. The detection result is shown in the following Table 1:

TABLE 1

| Sample | Detection temperature | Average of emissivity values |
|---|---|---|
| Fabric | 40° C. | 0.893 |

The far infrared ray detection result of another fabric which made from the said nano-powder mixture is shown below. This test is operated by Tze-Chiang Foundation of Science & Technology (Taiwan). The instrument for measuring is TSS-5X spectrophotometer. The detection area is 15 mm and the detection distance is 13 mm. The detection result is shown in the following Table 2:

TABLE 2

| Sample | Detection temperature | Average of emissivity values |
|---|---|---|
| Fabric | 25° C. | 0.92 |

Next, the clothes and the pants made of the fabric of this disclosure are used to do the following human subject research. There are five subjects between 20-40 years old in this research. The blood stream volume, blood stream speed and skin temperature of the chest center were measured at 10 minutes before the subject wore the samples (the clothes and the pants made of the fabric of this disclosure) and at 20 minutes after the subject wore the samples. The subjects sat when measuring the blood stream volume, the blood stream speed and the skin temperature. The measuring instrument is Laser Doppler blood flow monitor (moor VMS-LDF2). The environmental temperature is 20±2° C. and the moisture is 65±5% R.H. when measuring the blood stream volume, the blood stream speed and the skin temperature. The detection results are shown in following Table 3:

TABLE 3

| Detection item | | Detection result |
|---|---|---|
| blood stream volume | Before wearing the samples | 23.9 |
| | After wearing the samples for 20 minutes | 26.8 |
| | Differences (%) | +12.1 |
| blood stream speed | Before wearing the samples | 15.4 |
| | After wearing the samples for 20 minutes | 17.1 |
| | Differences (%) | +11.0 |
| skin temperature (° C.) | Before wearing the samples | 34.2 |
| | After wearing the samples for 20 minutes | 36.9 |
| | Differences (%) | +2.7 |

The detection results are the means of five subjects.

According to the results shown in Table 1 and Table 2, the far infrared ray emissivity of the fabric made from the said nano-powder mixture is above or equal to 0.893. According to the results shown in Table 3, the blood stream volume, the blood stream speed and the skin temperature are all increased after the subjects wore the samples which made of the fabrics of the disclosure. According to the above results, the nano-powder mixture of the disclosure has great ability to emit far infrared rays. In addition, the yarn and the fabric which made from the nano-powder mixture can increase blood circulation and thus increase the skin temperature of the users.

As mentioned above, the yarn and the fabric are made from the grain. The grain is made from the nano-powder mixture which has good ability to emit far infrared rays. Moreover, the nano-powder mixture of the yarn made from the grain would not detach from the yarn. Therefore, the far infrared rays emitting ability of the fabric made of the yarn is not gradually reduced according to use time. Further, the textiles made from the fabric of disclosure could increase blood circulation and thus increase the skin temperature of the users.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. A yarn made from a mixture of a grain and a first polymer by spinning, wherein the yarn comprises a plurality of fibers, each of the fibers has a surface layer and a core layer, the core layer is surrounded by the surface layer, the surface layer is made from the grain and the first polymer, the core layer is made from the first polymer, the grain is produced from a nano-powder mixture and a second polymer at a temperature between 235° C. to 245° C. and an injection pressure of the jet between 400 to 800 kg/cm², and a particle size of the grain is from 0.1 cm to 0.5 cm, a weight percentage of the nano-powder mixture in the grain is from 60% to 70%, the nano-powder mixture comprises silicon dioxide, magnesium oxide and aluminum oxide, a weight ratio of the silicon dioxide to the magnesium oxide in the nano-powder mixture is from 2:1 to 1:2, and a weight ratio of the silicon dioxide to the aluminum oxide in the nano-powder mixture is from 2:1 to 1:2, the first polymer is selected from the group consisting of polyethylene, polypropylene, polyester, polyacrylonitrile, polyamide, or any combination thereof, the second polymer is selected from the group consisting of polyethylene, polypropylene, polyester, polyacrylonitrile, polyamide, or any combination thereof.

2. The yarn of claim 1, wherein the nano-powder mixture further comprises calcium oxide, and a weight ratio of the silicon dioxide to the calcium oxide in the nano-powder mixture is from 2:1 to 1:2.

3. The yarn of claim 1, wherein the nano-powder mixture further comprises zinc oxide, and a weight ratio of the silicon dioxide to the zinc oxide in the nano-powder mixture is from 2:1 to 1:2.

4. The yarn of claim 1, wherein the nano-powder mixture further comprises potassium oxide, and a weight ratio of the silicon dioxide to the potassium oxide in the nano-powder mixture is from 2:1 to 1:2.

5. The yarn of claim 1, wherein the nano-powder mixture further comprises calcium oxide, zinc oxide and potassium oxide, and the silicon dioxide, the magnesium oxide, the aluminum oxide, the calcium oxide, the zinc oxide and the potassium oxide are in a weight ratio of 1:1:1:1:1:1.

6. The yarn of claim 1, wherein a particle size of the nano-powder mixture is from 450 nm to 500 nm.

7. The yarn of claim 1, wherein a weight percentage of the core layer in each of the fibers is from 70% to 80%, and a weight percentage of the surface layer in each of the fibers is from 20% to 30%.

8. The yarn of claim 7, wherein a weight percentage of the nano-powder mixture in the surface layer of each of the fibers is from 5% to 10%.

9. A fabric manufactured by textile processing from warp yarns and weft yarns, wherein at least one of the warp yarns and the weft yarns comprises the yarn of claim 1.

10. The fabric of claim 9, wherein the nano-powder mixture further comprises calcium oxide, and a weight ratio of the silicon dioxide to the calcium oxide in the nano-powder mixture is from 2:1 to 1:2.

11. The fabric of claim 9, wherein the nano-powder mixture further comprises zinc oxide, and a weight ratio of the silicon dioxide to the zinc oxide in the nano-powder mixture is from 2:1 to 1:2.

12. The fabric of claim 9, wherein the nano-powder mixture further comprises potassium oxide, and a weight ratio of the silicon dioxide to the potassium oxide in the nano-powder mixture is from 2:1 to 1:2.

13. The fabric of claim 9, wherein the nano-powder mixture further comprises calcium oxide, zinc oxide and potassium oxide, and the silicon dioxide, the magnesium oxide, the aluminum oxide, the calcium oxide, the zinc oxide and the potassium oxide are in a weight ratio of 1:1:1:1:1:1.

14. The fabric of claim 9, wherein a weight percentage of the core layer in each of the fibers is from 70% to 80%, and a weight percentage of the surface layer in each of the fibers is from 20% to 30%.

15. The fabric of claim 14, wherein a weight percentage of the nano-powder mixture in the surface layer of each of the fibers is from 5% to 10%.

16. A fabric manufactured by knitting the yarn of claim 1.

17. The fabric of claim 16, wherein the nano-powder mixture further comprises calcium oxide, and a weight ratio of the silicon dioxide to the calcium oxide in the nano-powder mixture is from 2:1 to 1:2.

18. The fabric of claim 16, wherein the nano-powder mixture further comprises zinc oxide, and a weight ratio of the silicon dioxide to the zinc oxide in the nano-powder mixture is from 2:1 to 1:2.

19. The fabric of claim 16, wherein the nano-powder mixture further comprises potassium oxide, and a weight ratio of the silicon dioxide to the potassium oxide in the nano-powder mixture is from 2:1 to 1:2.

20. The fabric of claim 16, wherein the nano-powder mixture further comprises calcium oxide, zinc oxide and potassium oxide, and the silicon dioxide, the magnesium oxide, the aluminum oxide, the calcium oxide, the zinc oxide and the potassium oxide are in a weight ratio of 1:1:1:1:1:1.

21. The fabric of claim 16, wherein a weight percentage of the core layer in each of the fibers is from 70% to 80%, and a weight percentage of the surface layer in each of the fibers is from 20% to 30%.

22. The fabric of claim 21, wherein a weight percentage of the nano-powder mixture in the surface layer of each of the fibers is from 5% to 10%.

* * * * *